United States Patent
Barkan et al.

(10) Patent No.: US 8,019,158 B2
(45) Date of Patent: Sep. 13, 2011

(54) METHOD AND COMPUTER PROGRAM PRODUCT FOR RECOGNITION ERROR CORRECTION DATA

(75) Inventors: Ella Barkan, Haifa (IL); Tal Drory, Haifa (IL); André Heilper, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 11/968,208

(22) Filed: Jan. 2, 2008

(65) Prior Publication Data

US 2009/0169106 A1 Jul. 2, 2009

(51) Int. Cl.
*G06K 9/34* (2006.01)

(52) U.S. Cl. .................................. 382/177; 382/229

(58) Field of Classification Search .................. 382/177, 382/182, 229, 309; 704/9, 228; 707/104.1
See application file for complete search history.

(56) References Cited

U.S. PATENT DOCUMENTS

| | | | |
|---|---|---|---|
| 3,969,700 A | 7/1976 | Bollinger et al. | |
| 7,092,567 B2 | 8/2006 | Ma et al. | |
| 7,106,905 B2 | 9/2006 | Simske | |
| 2005/0123203 A1* | 6/2005 | Heilper et al. | 382/229 |

* cited by examiner

*Primary Examiner* — Duy M Dang

(57) ABSTRACT

A method for altering a recognition error correction data structure, the method includes: altering at least one key out of a set of semantically similar keys in response to text appearance probabilities of keys of the set of semantically similar keys to provide an at least one altered key; and replacing the at least one key by the at least one altered key.

20 Claims, 2 Drawing Sheets

METHOD AND COMPUTER PROGRAM PRODUCT FOR RECOGNITION ERROR CORRECTION DATA

FIELD OF THE INVENTION

The present invention relates to methods and computer program products for recognition error correction.

BACKGROUND OF THE INVENTION

It is desired to extract textual information from images captured by various capture devices.

The information extraction process (also referred to as recognition process) is problematic and error prone.

Various recognition error correction processes (also referred to as verification processes) were developed in order to automatically correct errors of the recognition process.

Some of these verification processes are based upon fuzzy search engines that search a dictionary or lexicon for the best matching key. The best matching key is the key that is closest to the recognition process result.

The fuzzy search error rate depends upon the density, or level of population of the dictionary or the lexicon. The higher this density becomes the probability of error increases.

In order to reduce the effect of this density on the fuzzy search error rate some recognition error correction processes alter their matching algorithm such as to ignore parts of the dictionary (or lexicon) while searching other parts of the dictionary (or lexicon). These modifications prevent the same matching algorithms from being used in multiple applications, which can slow down and complicate the matching process and are also error prone.

There is a growing need to correct errors of a recognition process in an efficient manner.

SUMMARY

A method for altering a recognition error correction data structure, the method including: altering at least one key out of a set of semantically similar keys in response to text appearance probabilities of keys of the set of semantically similar keys to provide an at least one altered key; and replacing the at least one key by the at least one altered key.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Recognition error correction process can be improved by amending recognition error correction data structures (such as dictionaries, lexicons and the like) in response to additional information relating to keys of the recognition error correction data structures or to additional information relating to the text that is being recognized. This additional information can be provided from an information source that differs from the recognition error correction data structure. The additional information can reflect a probability that a key appears in a text that is being recognized by the recognition process. For example, if the text was captured at a certain location then the additional information can relate to that certain location.

Conveniently, the altered recognition error correction data structure can be searched for a best matching key (non-altered key or altered key) without altering the matching algorithm. By amending keys the altered recognition error correction data structure becomes sparser as similar keys are altered to provide altered keys that are more distant from each other.

It is noted that the recognition error correction data structure can be used during error correction processes. The error correction process can search for a best matching key for (i) a recognition process result or for (ii) an altered recognition process result that includes the recognition process result and additional information.

Conveniently, the selection of a best matching key is responsive to character replacement costs and these character replacement costs are determined such as to affect the selection probability of altered keys. Especially, causing the selection probabilities of altered keys to resemble the text appearance probabilities of the corresponding (non-altered) keys.

Figure 1:
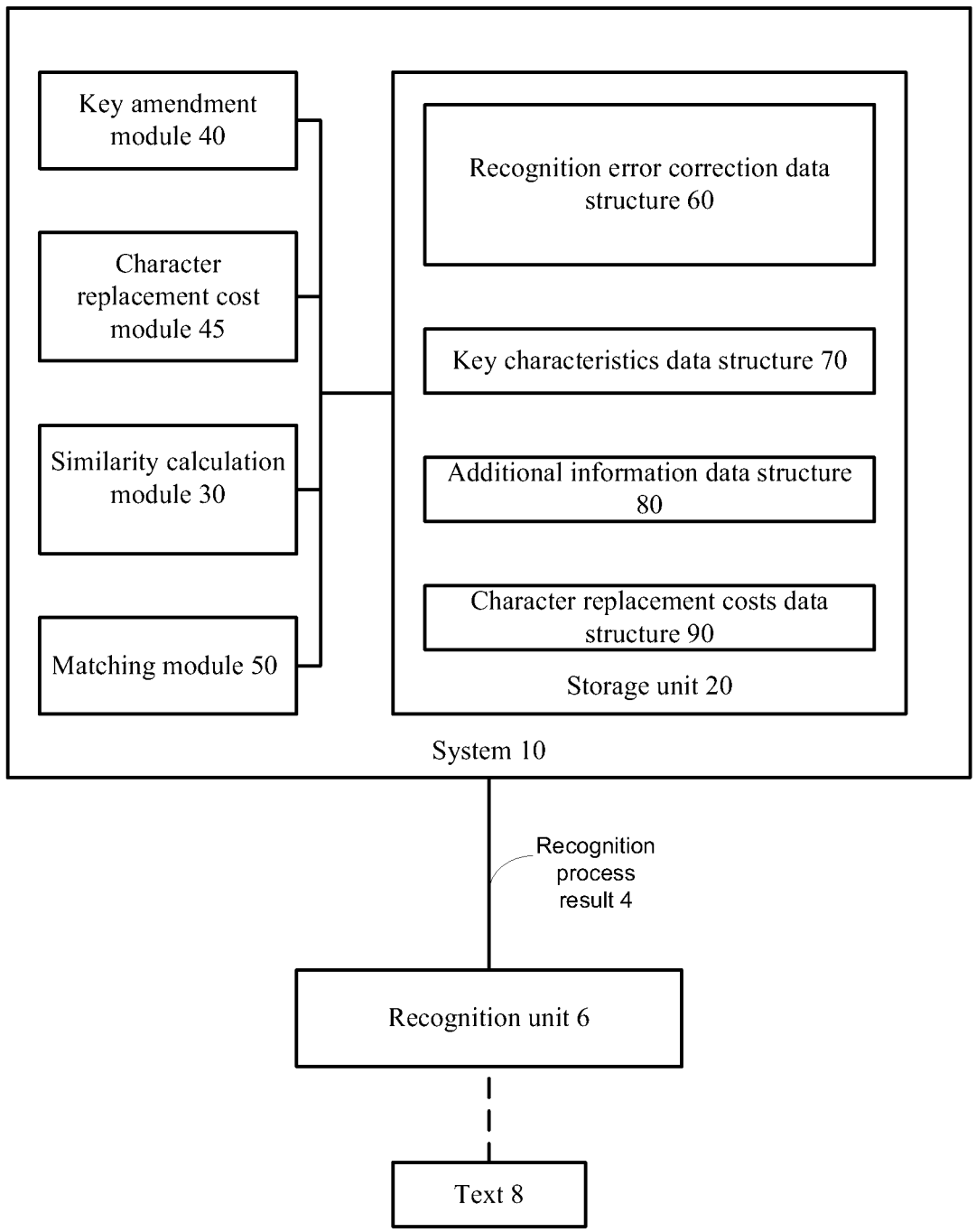
FIG. 1 illustrates a system for recognition error correction according to an embodiment of the invention.

FIG. 1 illustrates system 10 for recognition error correction according to an embodiment of the invention.

According to an embodiment of the invention system 10 only processes a recognition error correction data structure in order to generate multiple altered keys that replace corresponding keys (non-altered keys) of the recognition error correction data structure.

According to another embodiment of the invention (that is illustrated in FIG. 1) system 10 can also use the recognition error correction data structure (that conveniently includes multiple altered keys and multiple non-altered keys) during a recognition error correction process.

System 10 is connected to (or can include) recognition unit 6 that applies a recognition process (such as OCR) on text 8 to provide recognition process result 4.

Recognition process result 4 is sent to system 10. System 10 performs a recognition error correction process during which it searches for the key (including altered keys and non-altered keys) that best matches recognition process result 4.

According to another embodiment of the invention system 10 receives additional information and a recognition process result and searches for a key that best matches an altered recognition process result that includes the recognition process result and the additional information.

System 10 includes storage unit 20, similarity calculation module 30, key amendment module 40, character replacement cost module 45 and matching module 50. These modules are connected to each other and to storage unit 20. It is noted that modules 30, 40 and 50 can be integrated with each other, and that they can be implemented by software, hardware, firmware, middleware or a combination thereof.

It is further noted that system 10 can be connected to matching module 50 rather than including it, especially if system 10 is not intended to perform the matching process itself.

Storage unit 20 stores one or more data structures such as recognition error correction data structure 60, key characteristics data structure 70, additional information data structure 80 and character replacement costs data structure 90.

Recognition error correction data structure 60 includes multiple keys. These keys can be amended or non-amended.

Key characteristics data structure 70 stores characteristics of keys that can indicate what is the text appearance probability of a key—what is the probability that a recognized text will include that key. A key characteristic can be a geographical characteristic (such as location), a demographic characteristic (such as a population of a city, inclusion of important buildings or other attractions in a city, and the like). It is assumed that the text appearance probability of a very large and highly populated city is much higher than the text appearance probability of a very small town that has not attractions.

When system 10 processes recognition error correction data structure 60, and conveniently when is sets the character replacement costs of characters of an amended key, the key characteristics should be taken into account.

Additional information data structure 80 stores additional information that can be received from information sources that conveniently differ from recognition unit 6. The additional information can include, for example, where the text was acquired. This additional information can be fed to matching module 10.

Figure 2:
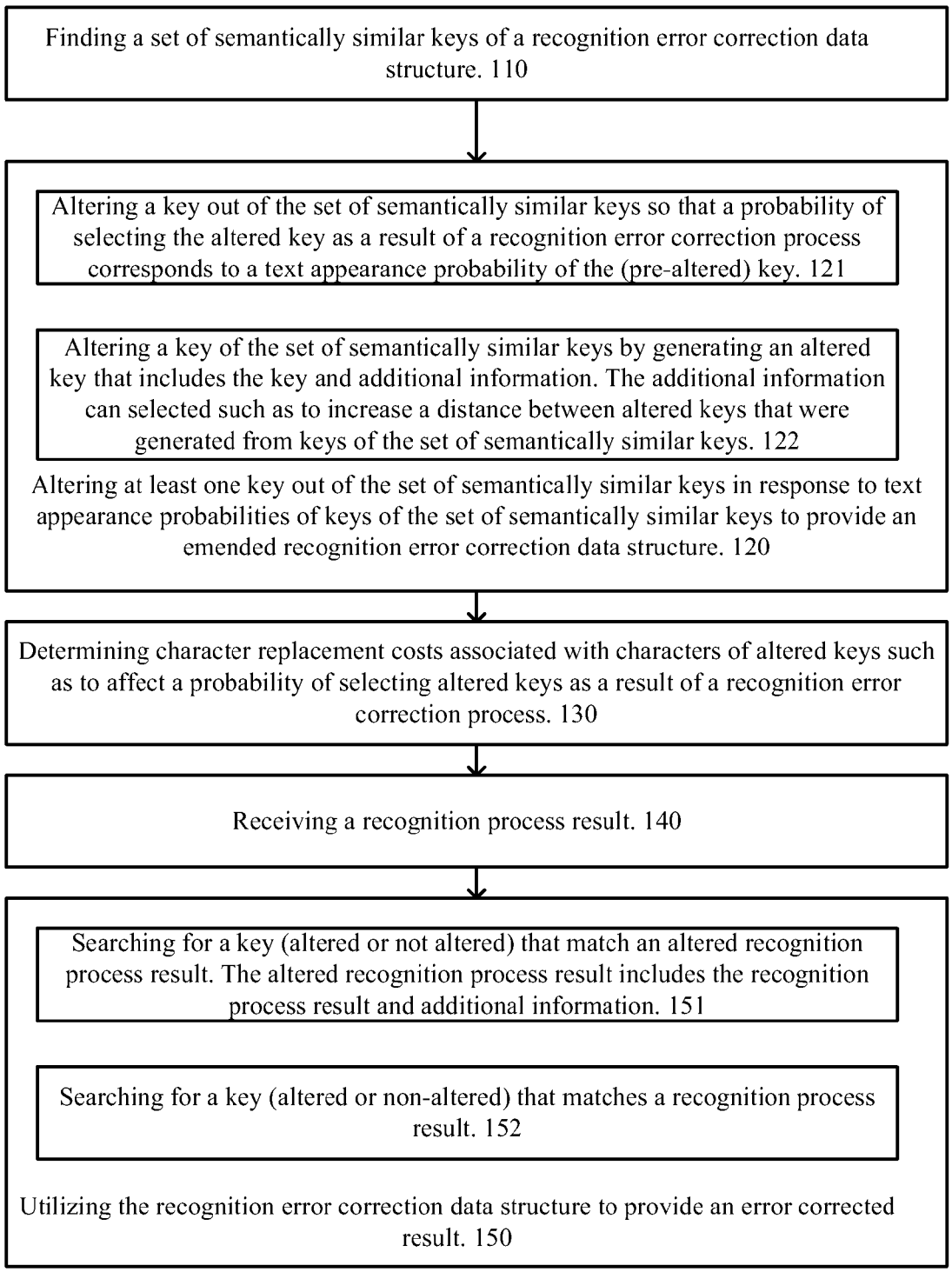
FIG. 2 illustrates a method for recognition error correction according to an embodiment of the invention.

As will be illustrated in greater detail in relation to FIG. 2, recognition error correction data structure 60 is altered. The alteration process includes finding sets of semantically similar keys (by similarity calculation module 30) and then amending (by key amendment module 40) at least one key of each set to provide amended keys that are spaced apart from each other.

Similarity calculation module 30 can scan the whole recognition error correction data structure 60 or portions of this data structure.

Character replacement cost module 45 can determine the cost of replacement of characters or receive instruction that affect the cost of the replacement of characters. This cost affects the decisions made by matching module 50, especially when the best matching key is associated with the lowest replacement cost.

Recognition error correction data structure 60 can be a dictionary, a lexicon or any other data structure that can be utilized during a recognition error correction process.

FIG. 2 illustrates method 100 for providing a recognition error correction data structure according to an embodiment of the invention. Method 100 can be implemented by system 10 of FIG. 1.

Method 100 starts by stage 110 of finding a set of semantically similar keys of a recognition error correction data structure. Referring to the example set forth in FIG. 1, similarity calculation module 30 finds a set of semantically similar keys within recognition error correction data structure 60.

Stage 110 is followed by stages 120 and 130.

Stage 120 includes altering at least one key out of the set of semantically similar keys in response to text appearance probabilities of keys of the set of semantically similar keys to provide an emended recognition error correction data structure.

Stage 120 can include at least one stage out of stages 121 and 122 or a combination thereof.

Stage 121 includes altering a key out of the set of semantically similar keys so that a probability of selecting the altered key as a result of a recognition error correction process corresponds to a text appearance probability of the (pre-altered) key.

Stage 122 includes altering a key of the set of semantically similar keys by generating an altered key that includes the key and additional information. The additional information can selected such as to increase a distance between altered keys that were generated from keys of the set of semantically similar keys.

The alteration can be responsive to a key characteristic selected from a geographical characteristic of the key and a demographical characteristic of the key.

It is noted that the alteration can involve concatenation, information merger, generation of a distribution of characters of the pre-altered key and the additional information.

It is further noted that the additional information is selected such as to generate an altered key that differs from other keys of the recognition error correction data structure. Conveniently, the additional information includes a string of characters that differ from keys (or substrings of keys) of the recognition error correction data structure.

Referring to the example set fourth in FIG. 1, key amendment module 40 can amend keys of recognition error correction data structure 60. It can retrieve key characteristics from key characteristics data structure 70.

Stage 130 includes determining character replacement costs associated with characters of altered keys such as to affect a probability of selecting altered keys as a result of a recognition error correction process.

Conveniently, multiple repetitions of stage 110, 120 and 130 are executed. The whole recognition error correction data structure (or a portion of that data structure) can be scanned in order to find sets of semantically similar keys and amending keys of each of these sets. It is noted that a set can include two or more semantically similar keys and that are alteration process can generate multiple altered keys that are spaced apart from each other.

Stage 130 and 120 are followed by stage 140 of receiving a recognition process result. Typically, stages 120 and 130 are executed off-line while stage 140 and 150 are executed in-line.

Referring to the example set forth in FIG. 1, system 10 receives recognition process result 4.

Stage 140 is followed by stage 150 of utilizing the recognition error correction data structure to provide an error corrected result.

Referring to the example set fourth in FIG. 1, matching module 50 receives recognition process result 4 and optionally additional information and searches recognition error correction data structure 60 to find the best matching key (non-amended or amended).

Conveniently, stage 150 can include either one of stages 151 or 152 or a combination thereof.

Stage 151 includes searching for a key (altered or not altered) that match an altered recognition process result. The altered recognition process result includes the recognition process result and additional information.

Stage 152 includes searching for a key (altered or non-altered) that matches a recognition process result.

The following two examples will further illustrate how method 100 can be applied and how system 10 operates, according to various embodiments of the invention.

The first example is based upon the following assumptions: (i) the additional information is a tag, (ii) recognition error correction data structure 60 is a lexicon that includes two dialects—Castilian dialect and Catalonian dialect, (iii) text 8 is captured in Catalonia, (iv) the matching algorithm is responsive to the Damerau—Levenshtein editing distance, and (v) the recognition process result 4 is 'localitad'. This recognition process result includes one recognition error— the seventh letter 'd' was erroneously recognized as 't'.

System 10 concatenate tags that represent different dialects (different spelling types) to keys of the lexicon according to dialect that includes them. Conveniently, keys that have the same spelling in different dialects will not be altered. For example, the tag for keys that are included in the Catalonian dialect will be 'catalan_spell' and the tag for keys that are included in the Castilian dialect will be 'castilian_spell'.

Each key (K) in recognition error correction data structure 60 with a Castilian spelling will be altered to provide an altered key that has the following format: castilian_spell|K. Each key (K) in recognition error correction data structure 60 with a Catalonian spelling will be altered to provide an altered key that has the following format: catalan_spell|K. For example, 'localidad' (Catalonian dialect) and 'localitat' (Castilian dialect) will be changed to 'catalan_spell|localitat' and 'castilian_spell|localidad' respectively.

The additional information ('catalan_spell' and 'castilian_spell') space apart the altered keys from each other.

The searching algorithm (matching module 50) can be fed with recognition process result 4 and the additional information from additional information data structure 80. The additional information can indicate whether text 8 was acquired in a place that is populated by a majority of Castilians or was acquired in a place that is populated by a majority of Catalonians. These inputs will cause the matching module 50 to prefer the words with Catalonian spelling if the text was acquired (for example) in Barcelona.

It is noted that a prior art matching process that is based upon non-amended keys would fail to amend the error in recognition process result 4 ('localitad') as the two nearest candidates (non amended keys) to 'localitad' are 'localitat' and 'localidad' and both are spaced at the same distance from 'localitad'. In other words: Distance('localitad', 'localidad') =Distance('localitad', 'localitat')=substitution_cost('t', 'd').

According to an embodiment of the invention matching module 50 searches for a key that matches an amended recognition process result that includes recognition process result (W) 4 ('localitad') and additional information 'catalan_spell'. The additional information can be provided from a text capture device or from another source. It is noted that the additional information can be processed before being added to the recognition process result. For example, location information such as 'Barcelona' (text capture location) can be processed to provide 'catalan_spell').

Matching module 50 finds that the two nearest candidates to catalan_spell|localitad in the dictionary are: C1=catalan_spell|localitat and C2=castilian_spell|localidad.

Their distances to W are:

D1=Distance(W,C1)=substitution_cost('t','d');
D2=Distance(W,C2)=substitution_cost('t','d')+substitution_cost('castilian_spell', 'catalan_spell').

It is noted that the tags 'castilian_spell' and 'catalan_spell' were defined in the way that the substitution_cost('castilian_spell', 'catalan_spell') will cause to D2>>D1 and therefore C1 (catalan_spell|localitat) will be chosen as the best matching key.

The second example is based upon the following assumptions: (i) the additional information is a tag, (ii) recognition error correction data structure 60 is a postal dictionary of Germany, (iii) Frankfurt am Main is a very large city that is populated by 650,000 people while Frankfurt am Oder is a small city that is populated by people, (iv) the selection of the best matching key is responsive to the Damerau-Levenshtein's editing distance, and (v) text 8 includes the term 'Frankfurt am Main' that was recognized as Frankfurt am Indir. This recognition process result includes few recognition process errors—'M' was split to 'I', and 'N', 'a' was recognized as 'd' and 'n' was recognized as 'r'.

The second example differs from the first example by being responsive to key characteristics (reflecting the population of each of the cities). On the other hand the location of text 8 is not known. Matching module 50 will not be fed with additional information.

Both keys ('Frankfurt am Main' and 'Frankfurt am Oder') form a set of semantically similar keys. Similarity calculation module 30 can detect this similarity by applying various similarity calculation algorithms. It is assumed that the following similarity calculation algorithm is applied: (i) calculate a similarity value of the two keys by Similarity (Key1, Key2)=1−Distance(Key1,Key2)/Max(length(Key1), length (Key2), and (ii) declare similarity if the similarity value is above a predefined similarity threshold.

For example, assume that an editing operation costs 1 and that the similarity threshold is 0.7 then both keys ('Frankfurt am Main' and 'Frankfurt am Oder') are similar as their similarity value is 0.76 (above 0.7): Similarity(Frankfurt am Main, Frankfurt am Oder)=1−(4 editing operation/17)=1−4/17=0.76>0.7.

It is noted that the much larger population (650,000) of Frankfurt am Main indicates that it is much likely to appear in text 8. In other words the text appearance probability of Frankfurt am Main is much higher than the text appearance probability of Frankfurt am Oder.

Accordingly, the tags to be added to each of these keys and the character replacement cost associated with these tags will be designed such as to increase the probability that matching module 50 will elect Frankfurt am Main.

Altered keys (denoted CT1 and CT2) will generated by concatenating first tag (T1) with 'Frankfurt am Main' and concatenating second tag (T2) with 'Frankfurt am Oder'.

It is noted that without this alteration (and assuming that different editing operations have the same cost) then matching module 50 would have selected Frankfurt am Oder as the best match to recognition process result 'Frankfurt am Indir' as is spaced apart by three editing operations from Frankfurt am Indir, while Frankfurt am Main is spaced apart by four editing operations.

The cost of inserting or deleting tag T1 (which includes the cost of inserting or deleting each of the characters of tags T1) is selected to be much lower than the cost of inserting or deleting tag T2 (which includes the cost of inserting or deleting each of the characters of tags T2). Accordingly, when the recognition process result is compared to altered key (CT1) that includes the non-amended key (that is similar to the recognition process result) and tag T1 and when the recognition process result is compared to altered key (CT2) that includes the non-amended key (that is similar to the recognition process result) and tag T2 there is a greater chance that CT1 will be selected—unless there is a match between T2 and the recognition process result.

The cost of inserting or deleting a tag (IDcost($T$)) can be calculated by the following equation:

$$\text{IDcost}(T)=\text{Minimum } \{(\text{ErorrTolernace}*\text{length}(C)), (K*D*(1-P)\}.$$

Wherein D is the distance between non-amended keys C1 and C2; K is a coefficient that can vary in a predefined range (for example between zero and one), ErorrTolernace is a maximal error allowed during the matching process, P is the text appearance probability of the non-amended key.

It is assumed that D=Distance('Frankfurt am Main', 'Frankfurt am Oder')=4, K=0.5 (and accordingly the distance between these cities will be increased in 1.5 times); ErorrTolernace equals 30%; P1=0.92 and, P2=0.08 (taking in account that Population(C1)=650,000, and Population(C2)=60.000).

Based on these assumptions IDcost(T1)=0.16 while IDcost (T2)=1.84: cost_insertion_delition(T1)=Minimum {(0.3 * 17), (0.5 * 4 * 0.08)}=0.16 and cost_insertion_delition(T2)=Minimum{(0.3 * 17), (0.5 * 4 *0.92)}=1.84.

The matching process of recognition process result 'Frankfurt am INdir' will include calculating the distance (D1) between Frankfurt am Indir and CT1 and calculating the distance (D2) between Frankfurt am Indir and CT2.

D1=('Frankfurt am INdir', 'T1|'Frankfurt am Main')=4+0.16=4.16. D2=('Frankfurt am INdir', 'T2|'Frankfurt am Oder')=3+1.84=4.84/D1 is smaller than D2 thus matching module 50 will select 'Frankfurt am Main'.

If the recognition process result was 'Frankfurt am Main' then the matching process of recognition process result 'Frankfurt am Main' will include calculating the distance (D1) between Frankfurt am Main and CT1 and calculating the distance (D2) between Frankfurt am Main and CT2.

D1=('Frankfurt am Main', 'T1|'Frankfurt am Main')=Idcost (T1)=0.16. D2=('Frankfurt am Main', 'T2|'Frankfurt am Oder')=4+1.84=5.84. Accordingly, matching module 50 will select 'Frankfurt am Main' while rejecting 'Frankfurt am Oder', as 5.84 is higher than the acceptable error rate (5.84>0.3*length of the recognition process result).

If the recognition process result was 'Frankfurt am Oder' then the matching process of recognition process result 'Frankfurt am Oder' will include calculating the distance (D1) between Frankfurt am Oder and CT1 and calculating the distance (D2) between Frankfurt am Oder and CT2.

D1=('Frankfurt am Oder', 'T1|'Frankfurt am Main')=4+0.16=4.16. D2=('Frankfurt am Oder', 'T2|'Frankfurt am Oder')=Idcost (T2)=1.84. Accordingly, matching module 50 will select 'Frankfurt am Oder'.

It is noted that although the two examples referred to a set that includes two semantically similar keys, the method can be expanded to managing sets that include more than two semantically similar keys.

For example, the set can include key C3 that is semantically similar to key C2 but represent a larger city than C2. In this case the third key will be amended by a third tag (T3) that will space apart CT3 from CT2.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for altering a recognition error correction data structure, the method comprising:
    altering at least one key out of a set of semantically similar keys in response to text appearance probabilities of keys of the set of semantically similar keys to provide an at least one altered key; and
    replacing the at least one key by the at least one altered key, wherein any of the steps are implemented in either of computer hardware or computer software and embodied in a non-transitory computer-readable medium, the computer hardware or computer software comprising at least one of a key amendment module, a character replacement cost determination module, a similarity calculation module and a matching module.

2. The method according to claim 1 comprising altering a key out of the set of semantically similar keys so that a probability of selecting an altered key as a result of a recognition error correction process corresponds to a text appearance probability of the corresponding key.

3. The method according to claim 1 comprising altering a key of the set of semantically similar keys by generating an altered key that comprises the key and additional information.

4. The method according to claim 3 wherein the additional information is selected such as to increase a distance between altered keys that were generated from keys of the set of semantically similar keys.

5. The method according to claim 1 comprising generating an altered key that differs from other keys of the recognition error correction data structure.

6. The method according to claim 1 comprising determining character replacement costs associated with characters of altered keys such as to affect a probability of selecting altered keys as a result of a recognition error correction process.

7. The method according to claim 1 wherein the altering is responsive to a key characteristic selected from a geographical characteristic of the key and a demo graphical characteristic of the key.

8. The method according to claim 1 further comprising receiving a recognition process result and utilizing the recognition error correction data structure to provide an error corrected result;
    wherein the recognition error correction data structure comprises multiple keys and multiple altered keys.

9. The method according to claim 8 further comprising searching for an altered key that matches an altered recognition process result;
    wherein the altered recognition process result comprises the recognition process result and additional information.

10. A computer program product comprising a non-transitory computer usable medium including a computer readable program, the computer readable program comprising at least one of a key amendment module, a character replacement cost determination module, a similarity calculation module and a matching module, wherein the computer readable program when executed on a computer causes the computer to: alter at least one key out of a set of semantically similar keys in response to text appearance probabilities of keys of the set of semantically similar keys to provide an at least one altered key; and replace the at least one key by the at least one altered key.

11. The computer program product according to claim 10 that causes the computer to alter a key out of the set of semantically similar keys so that a probability of selecting an altered key as a result of a recognition error correction process corresponds to a text appearance probability of the corresponding key.

12. The computer program product according to claim 10 that causes the computer to alter a key of the set of semantically similar keys by generating an altered key that comprises the key and additional information.

13. The computer program product according to claim 12 that causes the computer to select the additional information such as to increase a distance between altered keys that were generated from keys of the set of semantically similar keys.

14. The computer program product according to claim 10 that causes the computer to generate an altered key that differs from other keys of the recognition error correction data structure.

15. The computer program product according to claim 10 that causes the computer to determine character replacement costs associated with characters of altered keys such as to affect a probability of selecting altered keys as a result of a recognition error correction process.

16. The computer program product according to claim 10 that causes the computer to alter the key in response to a key characteristic selected from a geographical characteristic of the key and a demo graphical characteristic of the key.

17. The computer program product according to claim 10 that causes the computer to receive a recognition process result and utilize the recognition error correction data structure to provide an error corrected result;

wherein the altered recognition process result comprises the recognition process result and additional information.

18. The computer program product according to claim 17 that causes the computer to search for an altered key that matches an altered recognition process result;

wherein the altered recognition process result comprises the recognition process result and additional information.

19. A computer program product comprising a non-transitory computer usable medium including a computer readable program, the computer readable program comprising at least one of a key amendment module, a character replacement cost determination module, a similarity calculation module and a matching module, wherein the computer readable program when executed on a computer causes the computer to: generate an altered recognition process result that comprises a recognition process result and additional information; and to search for an altered key that matches the altered recognition process result.

20. The computer program product according to claim 19 that causes the computer to search for the altered recognition process result that comprises a recognition process result and additional information that is associated with a location associated with the recognition process result.

\* \* \* \* \*